(12) United States Patent
Saito et al.

(10) Patent No.: US 6,834,495 B2
(45) Date of Patent: Dec. 28, 2004

(54) MULTI-FAN SYSTEM SEPARATED CORE ENGINE TYPE TURBOFAN ENGINE

(75) Inventors: Yoshio Saito, Kiyose (JP); Masanori Endo, Inagi (JP); Yukio Matsuda, Kodaira (JP); Nanahisa Sugiyama, Kashiwa (JP); Takeshi Tagashira, Higashikurume (JP)

(73) Assignee: National Aerospace Laboratory of Japan, Tokyo (JP)

( * ) Notice: Subject to any disclaimer, the term of this patent is extended or adjusted under 35 U.S.C. 154(b) by 60 days.

(21) Appl. No.: 10/341,386

(22) Filed: Jan. 14, 2003

(65) Prior Publication Data

US 2003/0146344 A1 Aug. 7, 2003

(30) Foreign Application Priority Data

Jan. 16, 2002 (JP) ........................................ 2002-008071

(51) Int. Cl.[7] ................... F02K 11/00; F02K 3/00; F02K 7/00; F02K 9/00; F02K 9/74
(52) U.S. Cl. ......................................... 60/224; 60/226.1
(58) Field of Search ............................... 60/224, 226.1, 60/263, 39.15, 39.183, 785, 782, 791

(56) References Cited

U.S. PATENT DOCUMENTS

| | | | | | |
|---|---|---|---|---|---|
| 2,940,689 A | * | 6/1960 | Howell | ...................... | 244/12.3 |
| 3,018,034 A | * | 1/1962 | Ferri | ........................... | 60/269 |
| 3,645,476 A | * | 2/1972 | Haberkorn | ................ | 244/12.3 |
| 3,739,580 A | * | 6/1973 | Bland et al. | .................. | 60/204 |
| 3,972,490 A | * | 8/1976 | Zimmermann et al. | .... | 244/12.3 |
| 4,519,562 A | * | 5/1985 | Willis | .......................... | 244/207 |
| 6,134,876 A | * | 10/2000 | Hines et al. | .................. | 60/791 |
| 6,415,597 B1 | * | 7/2002 | Futamura et al. | ............. | 60/224 |
| 6,543,718 B2 | * | 4/2003 | Provost | ..................... | 244/12.4 |
| 2002/0189230 A1 | * | 12/2002 | Franchet et al. | ............. | 60/204 |
| 2003/0131585 A1 | * | 7/2003 | Saito et al. | ................ | 60/226.1 |

FOREIGN PATENT DOCUMENTS

JP          5-87655          12/1993

* cited by examiner

Primary Examiner—Cheryl J. Tyler
Assistant Examiner—William H. Rodriquez
(74) Attorney, Agent, or Firm—Westerman, Hattori, Daniels & Adrian, LLP

(57) ABSTRACT

This invention provides a multi-fan system separated core engine type turbofan engine in which high pressure air is used as the working fluid for a turbine which drives a fan, thereby reducing the manufacturing costs of the turbofan engine and simplifying the constitution thereof. A turbine for driving a fan 11 which is provided in a propulsion device 3 of the multi-fan system separated core engine type turbofan engine 1 is an air turbine 13 which is driven by the supply through a duct 9 of a part of high pressure air compressed in a compressor 5 of a core engine 2. Since the working fluid of the air turbine 13 for driving the fan 11 is not high temperature combustion gas, there is no need to use expensive heat-resistant material for the turbine, and thus the propulsion device 3 can be manufactured at low cost, the constitution thereof can be simplified, and operational control can be ameliorated.

3 Claims, 2 Drawing Sheets

MULTI-FAN SYSTEM SEPARATED CORE ENGINE TYPE TURBOFAN ENGINE

BACKGROUND OF THE INVENTION

1. Field of the Invention

This invention relates to a multi-fan system separated core engine type turbofan engine comprising at least one core engine and a plurality of propulsion devices.

2. Description of the Prior Art

A conventional turbofan engine is constituted by a fan, a compressor, a combustor, and a turbine, wherein the turbine is driven by using high temperature combustion gas as working fluid produced in the combustor, and the fan is driven by the turbine. This type of turbofan engine is constituted such that the fan and turbine are disposed on the same axis, and therefore the same number of combustors and turbines as fans are necessary to drive the fans. Further, due to restrictions imposed by this disposition, the degree of freedom in the design of these engines is small. Moreover, when turbofan engines of conventional constitutions use a large number of fans in the airframe, the engine constitution becomes complicated, manufacturing costs rise, and operational control of the engine also becomes complicated.

An example of a turbofan engine for solving these problems is disclosed in Japanese Patent Publication No. H5-87655. The turbofan engine disclosed in this publication is a separated core engine type turbofan engine constituted by at least one core engine comprising a compressor, a combustor, and a turbine, and at least one propulsion device which is separated from the core engine and comprises a fan driving combustor which is supplied with high pressure air from the core engine through a high pressure air duct, a turbine, and a fan which is driven by this turbine.

The separated core engine type turbofan engine disclosed in this publication is constituted such that the core engine and propulsion device are disposed and constituted separately, and therefore the propulsion device can be disposed in a desired position without the restriction of being disposed on the same axis as the fan axis and turbine axis. When a separated core engine type turbofan engine of this type is installed in an aircraft, for example, the degree of freedom may be increased and so the desired object may be achieved. However, this propulsion device uses high temperature combustion gas as the working fluid of the turbine for driving the fan, and therefore comprises a fan driving combustor in the interior thereof. As a result, problems arise in that expensive heat-resistant material must be used for the turbine, and propulsion control, including the propulsion device constitution and combustion control, becomes complicated. Thus in this type of separated core engine type turbofan engine, there remains scope for further improvements in fan reliability and manufacturing cost reduction.

The problem that is to be solved in the propulsion device is to alleviate the heat resistance required for the turbine to simplify the constitution and propulsion control of the propulsion device by directly making use of the high pressure air which is supplied from the core engine.

SUMMARY OF THE INVENTION

An object of this invention is to provide a multi-fan system separated core engine type turbofan engine which is capable of solving the aforementioned problems in the prior art by using as working fluid on a turbine for driving a fan lower temperature working fluid rather than high temperature combustion gas, thereby eliminating the need to use expensive heat-resistant materials for the turbine and thus reducing the manufacturing costs of the turbofan engine, simplifying the constitution thereof, and also simplifying operational control.

In order to solve the aforementioned problems, the multi-fan system separated core engine type turbofan engine according to this invention is constituted by at least one core engine comprising a compressor, and a combustor and turbine for driving this compressor, and a plurality of propulsion devices disposed separately from the core engine and comprising an air turbine which is driven by high pressure air supplied from the core engine, and a fan which is driven by the air turbine.

According to the multi-fan system separated core engine type turbofan engine constituted in this manner, the turbine is driven by high temperature combustion gas produced in the combustor in at least one of the core engines, the compressor is driven by the output of the combustor, a part of the air compressed by the compressor is transmitted to the combustor, and fuel injected into the combustor is mixed with the air and burned. The remaining part of the high pressure air compressed by the compressor of the core engine is supplied to the plurality of propulsion devices, which are disposed separately to the core engine, to drive the air turbine in the propulsion devices. The output of the air turbine drives the fan so as to obtain thrust. The turbine which drives the fan is an air turbine and does not use combustion gas as working fluid. Therefore a combustor is not provided in the fan driving portion, enabling simplification and size-reduction of the constitution thereof and eliminating the need to use expensive heat-resistant material for the turbine. Engine control is also made easier.

When a plurality of core engines is provided in this separated core engine type turbofan engine, the high pressure air from the core engine may be distributed among and supplied to the plurality of propulsion devices via a common high pressure air control device for controlling temperature, pressure, and so on. When a system constitution comprising a plurality of core engines and a plurality of propulsion devices is provided, the temperature, pressure, flow rate, and so on of the high pressure air from the plurality of core engines are controlled by the common high pressure air control device if irregularities appear in the amounts thereof, and the high pressure air required by the respective propulsion devices is controlled by the high pressure air control device to be distributed among and supplied to the plurality of propulsion devices.

In this multi-fan system separated core engine type turbofan engine, at least a part of the propulsion engines is used for vertical take-off and landing, and therefore this invention can be applied to a vertical take-off and landing aircraft. In other words, when the multi-fan system separated core engine type turbofan engine is applied to a vertical take-off and landing aircraft, at least one part of the propulsion devices may be used for vertical take-off and landing, and the remaining propulsion devices may be used as front and rear direction propulsion devices.

DESCRIPTION OF THE PREFERRED EMBODIMENTS

Figure 1:
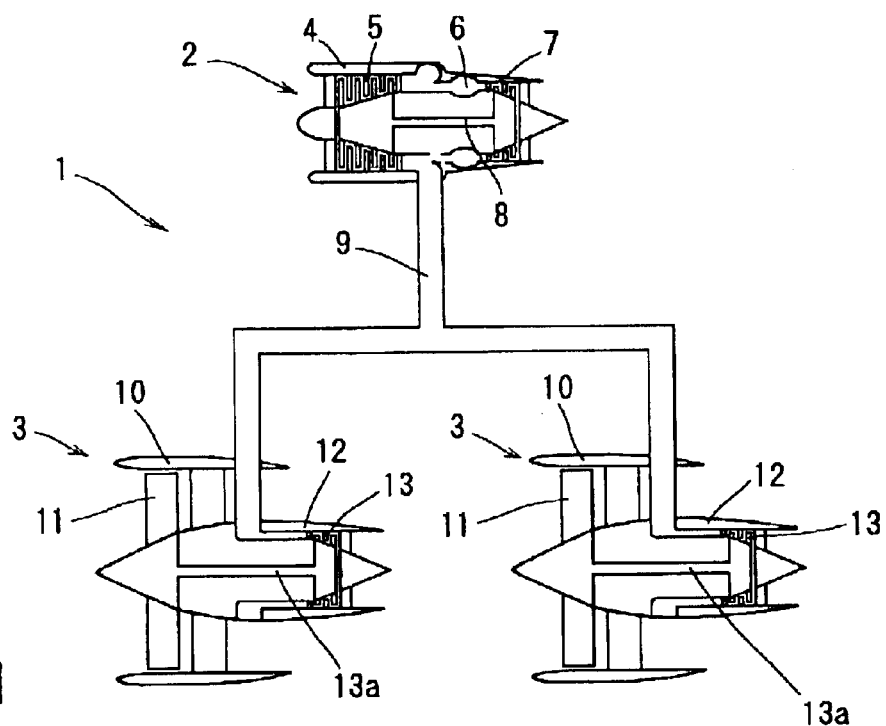
FIG. 1 is a schematic sectional diagram illustrating an example of a multi-fan system separated core engine type turbofan engine according to this invention.

Embodiments of the multi-fan system separated core engine type turbofan engine according to this invention will now be described on the basis of the attached drawings. FIG. 1 is a schematic sectional diagram illustrating an example of a multi-fan system separated core engine type turbofan engine according to this invention. The multi-fan system separated core engine type turbofan engine 1 shown in FIG. 1 is constituted by a core engine 2 and two propulsion devices 3, 3 which are separated from the core engine 2. The core engine 2 comprises a compressor 5, a combustor 6 for burning air fuel mixture in which air compressed by the compressor 5 is mixed with fuel, and a turbine 7 which is driven by combustion gas produced in the combustor 6 inside a case 4. The turbine 7 drives the compressor 5 via a shaft 8. The individual elements of the core engine 2 are well-known and detailed description thereof shall be omitted here. One part of the air which is compressed by the compressor 5 is led into the combustor 6 and turbine 7 and is used in the driving of the compressor 5 by the turbine 7. The remaining high pressure air is led into a duct 9.

Each of the propulsion devices 3 comprises a fan 11 inside a shroud 10, and an air turbine 13 inside a case 12 which is concentric with the fan 11. The fan 11 and air turbine 13 are linked by a shaft 13a. Well-known objects are used as the individual elements of the propulsion device 3. The duct 9 is connected to the air turbine 13 and high pressure air which enters the air turbine 13 from the core engine 2 through the duct 9 drives the air turbine 13. The running torque of the air turbine 13 passes through the shaft 13a to cause the fan 11 to rotate, thereby generating thrust.

As described above, the multi-fan system separated core engine type turbofan engine 1 uses a part of the high pressure air compressed by the compressor 5 of the core engine 2 as working fluid for driving the air turbine 13 of the propulsion device 3. Since high temperature combustion gas is not used, the propulsion device 3 does not have to be provided with a combustor, and therefore heat-resistant material is not necessary as the manufacturing material of the turbine 13. Accordingly, the propulsion device 3 can be manufactured at a reasonable cost, the constitution thereof is simplified, and complicated operational control, including combustion control, does not have to be performed.

Figure 2:
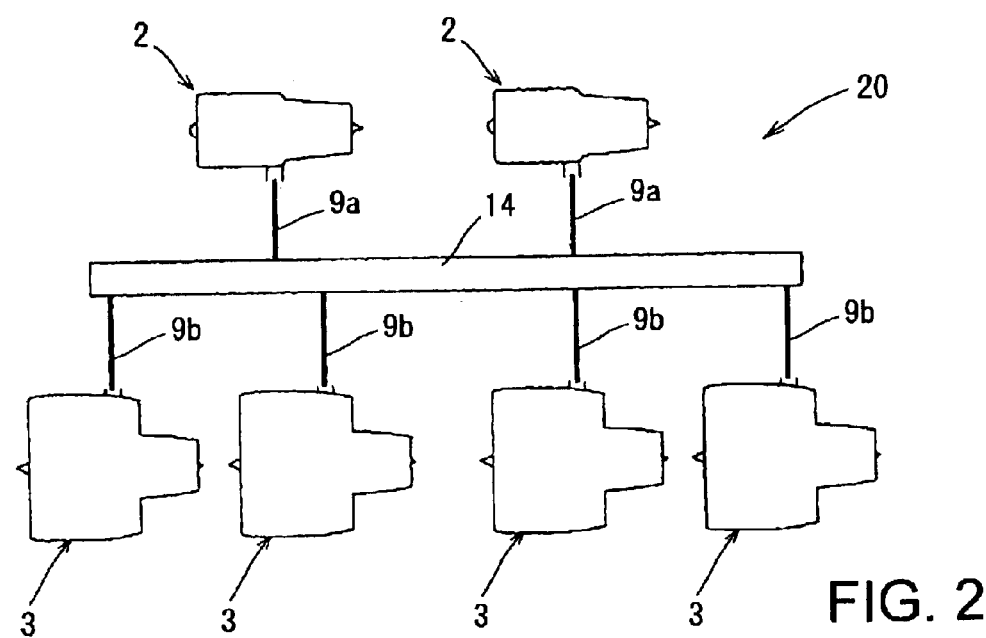
FIG. 2 is a schematic diagram illustrating another example of a multi-fan system separated core engine type turbofan engine according to this invention.

FIG. 2 is a schematic diagram illustrating an application of the multi-fan system separated core engine type turbofan engine of this invention. The multi-fan system separated core engine type turbofan engine 20 illustrated in FIG. 2 is constructed in a system comprising two core engines 2 and four propulsion devices 3. The ducts 9a, 9a which extend from the core engines 2, 2 are connected to a common high pressure air control device 14. The high pressure air control device 14 controls the pressure, temperature, flow rate, and so on of the high pressure air supplied from the core engines 2, 2, and the controlled high pressure air is supplied to each propulsion device 3 from the high pressure air control device 14 through ducts 9b. If the pressure, temperature, flow rate and so on of the high pressure air supplied by the core engines 2, 2 differ, the amounts thereof are adjusted by the common high pressure air control device 14 such that the high pressure air is supplied to the propulsion devices 3 having been controlled to the required amounts. Of course the high pressure air may be supplied to the propulsion devices 3 directly from the core engines 2, 2 rather than through the high pressure air control device 14. Further, the number of core engines 2 and propulsion devices 3 is not limited to the number in the example in the drawing.

Figure 3:
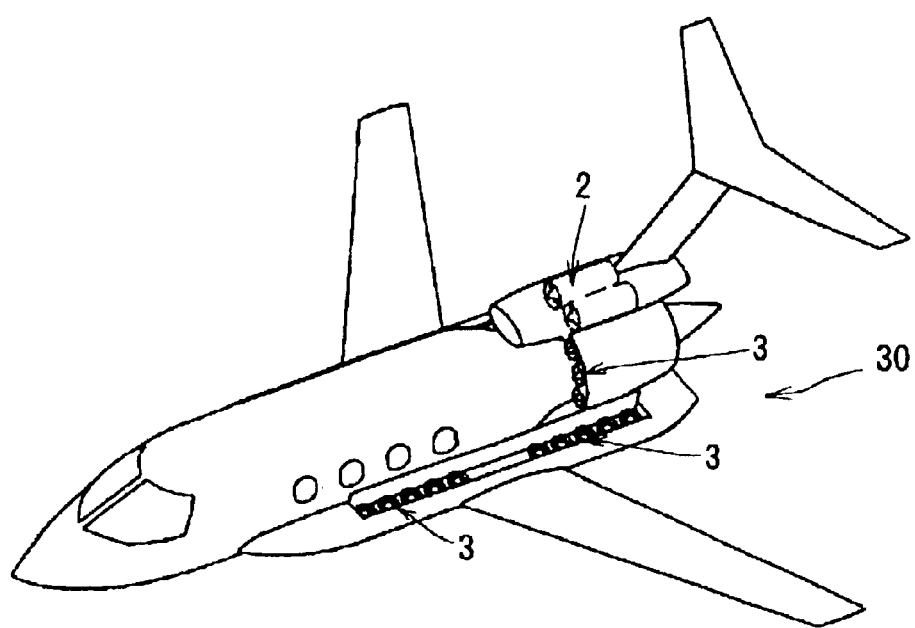
FIG. 3 is a schematic perspective view illustrating an example of a vertical take-off and landing aircraft to which the multi-fan system separated core engine type turbofan engine according to this invention has been applied.

FIG. 3 is a perspective view showing an outline of an example of a vertical take-off and landing aircraft to which the multi-fan system separated core engine type turbofan engine according to this invention is applied. The multi-fan system separated core engine type turbofan engine 30 shown in FIG. 3 comprises two core engines 2 disposed at the rear of the fuselage, and six propulsion devices 3 serving as propulsion fans disposed at the rear of the fuselage. In FIG. 3, only three propulsion devices 3 are illustrated on the left side of the fuselage, but three more are symmetrically disposed on the right side of the fuselage. Particularly in this example, twenty propulsion devices 3 serving as vertical take-off and landing fans are disposed on the side of the fuselage. In FIG. 3, only ten propulsion devices 3 are illustrated on the left side of the fuselage, but ten more are disposed on the right side of the fuselage. Thus the propulsion device 3 may be used both for thrust and for take-off and landing.

According to the multi-fan system separated core engine type turbofan engine of this invention, a part of the high pressure air which is compressed by a compressor of a core engine is used as working fluid for driving an air turbine of a propulsion device. As a result, high temperature combustion gas is not used to drive the fan-driving turbine of the propulsion device, and hence there is no need to provide a combustor in the propulsion device and heat-resistant material does not have to be used as the manufacturing material of the turbine. Thus, due to constitutional simplification in each fan, reliability is enhanced, and due to a reduction in manufacturing costs, price is reduced, and thereby a large number of fans can be dispersed over appropriate parts of the airframe and easily attached thereto. Further, complicated operational control, including combustion control, does not have to be performed. Hence multi-fan system separated core engine type turbofan engine may be provided with conventional individual constitutions but in a new combination such that manufacturing becomes easy, price is lowered, and control becomes easy.

What is claimed is:

1. A multi-fan system separated core engine type turbofan engine comprising:
   at least one core engine comprising a compressor, and a combustor and turbine for driving said compressor; and
   a plurality of propulsion devices disposed separately from said core engine and comprising an air turbine which is driven by high pressure air supplied from said core engine, and a fan which is driven by said air turbine.

2. The multi-fan system separated core engine type turbofan engine according to claim 1, wherein said high pressure air from said plurality of core engines is distributed among and supplied to said plurality of propulsion devices via a common high pressure air control device for controlling the temperature, pressure and so on of said high pressure air.

3. The multi-fan system separated core engine type turbofan engine according to claim 1, which is applied to a vertical take-off and landing aircraft by using at least one part of said propulsion devices for vertical take-off and landing.

* * * * *